(12) United States Patent
Faaborg et al.

(10) Patent No.: US 9,798,512 B1
(45) Date of Patent: Oct. 24, 2017

(54) CONTEXT-BASED VOLUME ADJUSTMENT

(71) Applicant: Google Inc., Mountain View, CA (US)

(72) Inventors: Alexander James Faaborg, Mountain View, CA (US); Daniel Marc Gatan Shiplacoff, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/042,884

(22) Filed: Feb. 12, 2016

(51) Int. Cl.
*G06F 17/00* (2006.01)
*G06F 3/16* (2006.01)

(52) U.S. Cl.
CPC .............. *G06F 3/165* (2013.01); *G06F 3/167* (2013.01)

(58) Field of Classification Search
CPC .......... H03G 3/32; H03G 3/20; H03G 3/3005; H03G 5/165; H03G 5/00; H03G 5/2025; H03G 5/16; H04S 7/00; H04S 2400/13; H04R 5/04; H04R 2430/01
See application file for complete search history.

(56) References Cited

U.S. PATENT DOCUMENTS

| | | | | |
|---|---|---|---|---|
| 6,360,187 B1* | 3/2002 | Hermann | ............ | G01C 21/3629 340/460 |
| 2003/0186662 A1* | 10/2003 | Himmel | .............. | B60R 25/2081 455/185.1 |
| 2004/0264705 A1* | 12/2004 | Hiipakka | ................ | H03G 5/165 381/71.1 |
| 2005/0089177 A1* | 4/2005 | Hughes | .................... | H03G 3/32 381/86 |
| 2005/0157885 A1* | 7/2005 | Olney | ...................... | H03G 3/32 381/58 |
| 2007/0265844 A1* | 11/2007 | Koyama | ........................ | 704/231 |
| 2008/0153537 A1* | 6/2008 | Khawand | .................. | H03G 3/32 455/550.1 |
| 2011/0169632 A1* | 7/2011 | Walker | ...................... | H03G 3/32 340/539.13 |
| 2013/0195280 A1* | 8/2013 | Sugiyama | ............... | H04M 1/60 381/57 |
| 2014/0270254 A1* | 9/2014 | Oishi | ...................... | H04R 3/04 381/98 |
| 2014/0369525 A1 | 12/2014 | Lin | | |

(Continued)

OTHER PUBLICATIONS

Thurrott, "Windows Phone 8.1 Tip: Master the New Custom Volume Setting" Retrieved on Nov. 10, 2015 from http://winsupersite.com/windows-phone/windows-phone-81-tip-master-new-custom-volume-settings, 18 pgs.

*Primary Examiner* — Andrew C Flanders
(74) *Attorney, Agent, or Firm* — Shumaker & Sieffert, P.A.

(57) ABSTRACT

In general, this disclosure is directed to techniques for adjusting various types of volumes based on audio present in a currently executing application. A computing device not currently outputting audio for playback at an audio output device operatively coupled to the computing device receives an indication of user input to adjust a volume level. Responsive to receiving the indication of the user input, the computing device determines context data based on content associated with the currently executing application. The computing device predicts, based on the context data, a type of audio that is planned to be output for playback at the audio output device. The type of audio is one of many types of audio capable of being output for playback. The computing device adjusts, based on the type of the audio, a respective volume level associated with the audio type.

20 Claims, 6 Drawing Sheets

(56) References Cited

U.S. PATENT DOCUMENTS

2015/0011195 A1 1/2015 Li  
2015/0280670 A1* 10/2015 Kauffmann ............. G10L 25/78  
                                                                                       381/107  
2016/0149547 A1* 5/2016 Rider ....................... H03G 3/04  
                                                                                       381/57

\* cited by examiner

CONTEXT-BASED VOLUME ADJUSTMENT

BACKGROUND

As computing devices, including mobile phones, laptop computers, tablet computers, etc., have become more complex, a computing device may interpret user input in a similarly increasing number of ways. For instance, a mobile phone may be configured with several different volume levels that may be adjusted, such as a ringtone volume level, a text tone volume level, a general media volume level, etc. However, most mobile computing devices still only include a single button configuration for adjusting the volume—thereby increasing the difficulty, and complexity associated with user adjustment of any particular volume level.

SUMMARY

In one example, a method may include receiving, by a computing device not currently outputting audio for playback at an audio output device operatively coupled to the computing device, an indication of user input to adjust a volume level of the computing device, and, responsive to receiving the indication of the user input, determining, by the computing device, context data based on content associated with an application currently executing on the computing device, predicting, by the computing device and based at least in part on the context data, a type of audio that is planned to be output for playback at the audio output device, wherein the type of audio is one of a plurality of types of audio capable of being output for playback at the audio output device, and adjusting, by the computing device and based at least in part on the type of the audio, a level of a respective volume associated with the type of audio.

In another example, a computing device may include an audio output device, at least one processor, and at least one module, operable by the at least on processor to receive, an indication of user input to adjust a volume level of the computing device, wherein the audio output device is not currently playing back audio output by the at least one processor, and, responsive to receiving the indication of the user input, determine context data based on content associated with an application currently executing on the computing device, predict, based at least in part on the context data, a type of audio that is planned to be output for playback at the audio output device, wherein the type of audio is one of a plurality of types of audio capable of being output for playback at the audio output device, and adjust, based at least in part on the type of the audio, a level of a respective volume associated with the type of audio.

In another example, a computer-readable storage medium is encoded with instructions that, when executed, cause at least one processor of a computing device to receive, an indication of user input to adjust a volume level of the computing device, wherein the computing device is not currently outputting audio for playback at an audio output device operatively coupled to the computing device, and, responsive to receiving the indication of the user input, determine context data based on content associated with an application currently executing on the computing device, predict, based at least in part on the context data, a type of audio that is planned to be output for playback at the audio output device, wherein the type of audio is one of a plurality of types of audio capable of being output for playback at the audio output device, and adjust, based at least in part on the type of the audio, a level of a respective volume associated with the type of audio.

The details of one or more examples of the disclosure are set forth in the accompanying drawings and the description below. Other features, objects, and advantages of the disclosure will be apparent from the description and drawings, and from the claims.

DETAILED DESCRIPTION

In general, this disclosure is directed to techniques for determining which volume level from among a plurality of volume levels to adjust on a computing device based on context data derived from content of a currently executing application. For example, a computing device may be executing an application that is outputting content for display at the computing device, where the content includes a form of media that is not currently being played (such as music or video). If a user provides user input to the computing device to adjust the volume of the computing device while the content that includes the media is being displayed but while the computing device is not outputting the media for playback, the computing device may determine that the user is attempting to adjust the volume related to the media included in the displayed content rather than a system volume or a ringtone volume. Similarly, if the computing device is displaying content that does not include any media, even if the content is within the same application, the computing device may determine that the user is attempting to adjust a volume level related to the system or the ringtone of the computing device. Once the computing device determines the desired volume level that the user is intending to adjust, the computing device may adjust the volume level(s) associated with the determined volume responsive to and based on the indication of user input.

In operation, the computing device may include a module executing with operating system privileges that traverses a view hierarchy of an application to determine what media may be present in currently displayed content associated with the currently executing application. Rather than merely adjusting the volume of a default volume type or the volume associated with audio currently being output by the computing device, by determining the type of volume a user may be attempting to adjust, the computing device may provide a more responsive, accurate, and efficient user interface for adjusting various volume levels. As such, the computing device may also proactively adjust volume for media about to be played rather than waiting for the media to actually be played. Proactively adjusting the volume to a desired level prior to outputting audio associated with that volume further reduces instances where the user unknowingly adjusts the wrong volume and outputs audio in the future at an undesired level.

Figure 1:
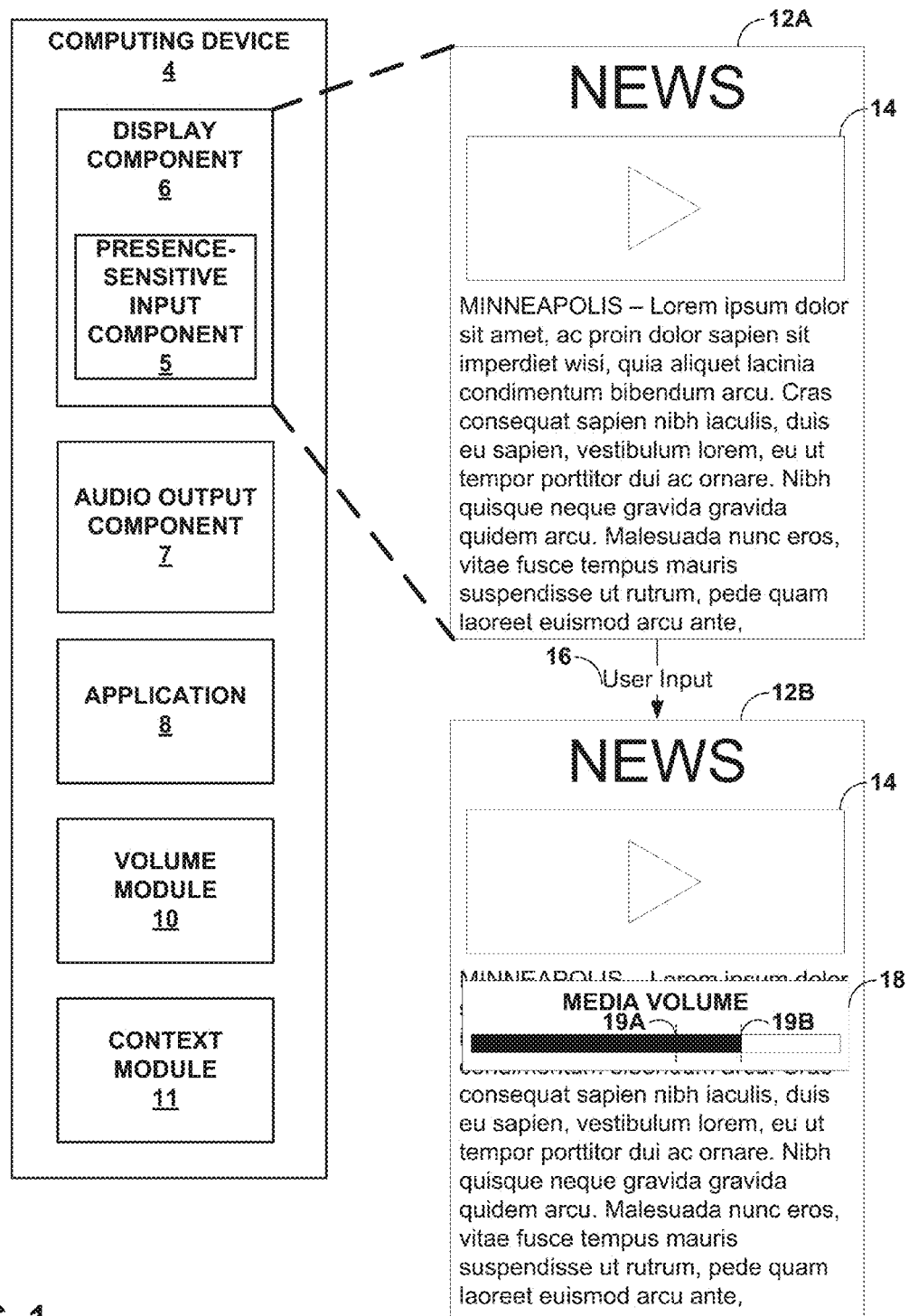
FIG. 1 is a conceptual diagram illustrating an example computing device that adjusts a volume type based on determined context data of content displayed on a display component, in accordance with one or more aspects of the present disclosure.

FIG. 1 is a conceptual diagram illustrating an example computing device that adjusts a volume type based on determined context data of content displayed on a display component, in accordance with one or more aspects of the present disclosure. As further described below, based at least in part on context data determined based on content associated with an application currently executing on the computing device, a computing device may predict a type of audio that is planned to be output for playback and adjust a corresponding volume.

As shown in FIG. 1, system 2 includes computing device 4. In the example of FIG. 1, computing device 4 is described as a mobile telephone. However, in some examples, computing device 4 may be a computerized watch (e.g., a smartwatch), computerized eyewear, computerized headwear, other types of wearable computing devices, a tablet computer, a personal digital assistant (PDA), a laptop computer, a gaming system, a media player, an e-book reader, a television platform, an automobile navigation system, a digital camera, or any other type of mobile and/or non-mobile computing device that is configured to control a display component. The display component may be integral to the computing device 4 or remote.

In this embodiment, computing device 4 includes display component 6, application 8, volume module 10, and context module 11. Application 8 and modules 10 and 11 may perform operations described herein using software, hardware, firmware, or a mixture of hardware, software, and/or firmware residing in and/or executing at computing device 4. Computing device 4 may execute application 8 and modules 10 and 11 with one or more processors. In some examples, computing device 4 may execute application 8 and modules 10 and 11 as one or more virtual machines executing on underlying hardware of computing device 4. Application 8 and modules 10 and 11 may execute as one or more services or components of operating systems or computing platforms of computing device 4. Application 8 and modules 10 and 11 may execute as one or more executable programs at application layers of computing platforms of computing device 4 with operating system privileges or with access to a runtime library of computing device 4. In some examples, display component 6, applications 8, and/or modules 10 and 11 may be arranged remotely to and be remotely accessible to computing device 4, for instance, via interaction by computing device 4 with one or more remote network devices.

Display component 6 of computing device 4 may include respective input and/or output components for computing device 4. In some examples, display component 6 may function as input component using presence-sensitive input component 5, such as a resistive touchscreen, a surface acoustic wave touchscreen, a capacitive touchscreen, a projective capacitance touchscreen, a pressure sensitive screen, an acoustic pulse recognition touchscreen, or another display component technology. Display component 6 may also include a display component that can output content in a graphical user interface in accordance with one or more techniques of the current disclosure, such as a liquid crystal display (LCD), a dot matrix display, a light emitting diode (LED) display, an organic light-emitting diode (OLED) display, e-ink, or similar monochrome or color displays capable of outputting visible information to a user of computing device 4.

In some examples, presence-sensitive input component 5 of display component 6 receives tactile input from a user of computing device 4. Presence-sensitive input component 5 of display component 6 may receive indications of tactile input by detecting one or more gestures from a user (e.g., the user touching or pointing to one or more locations of display component 6 with a finger or a stylus pen). Display component 6 may present output to a user, such as a graphical user interface (e.g., a user interface for viewing an alert based on notification data), which may be associated with functionality provided by computing device 4. For example, display component 6 may present various user interfaces related to the functionality of computing platforms, operating systems, applications, and/or services executing at or accessible by computing device 4 (e.g., notification services, electronic message applications, Internet browser applications, mobile or desktop operating systems, etc.). A user may interact with a user interface presented at display component 6 to cause computing device 4 to perform operations relating to functionality of computing device 4, application 8, or an operating system of computing device 4.

Context module 11 may analyze a view hierarchy for each running application 8, where the view hierarchy may be implemented as a list or other suitable data structure. Each view hierarchy may include a set of references to each element of a particular screen of a graphical user interface. For instance a view hierarchy of an application may include reference to a text view object that displays text, such that various properties (e.g., view object identifier, view object placement, etc.) of the text view object are accessible to context module 11. To illustrate, a user may be interacting with a first application 8A currently rendering a first graphical user interface. The user may then perform a first action and the first application 8A responds by rendering a different screen.

In the example of FIG. 1, computing device 4 may include audio output component 7. In some examples, audio output device 7 may be a speaker or a set of speakers incorporated into a housing of computing device 4. In other examples, audio output device 7 may be an external audio output device operatively coupled to computing device 4, such as headphones, an external speaker, a Bluetooth speaker, a vehicle's audio system, or any other device that can operatively connect to computing device 4 and output audio for playback. As such, computing device 4 may be a processor outputting audio to an external speaker or the entire device.

In accordance with techniques of this disclosure, display component 6 of computing device 4 may output graphical user interface 12A as generated by application 8. To illustrate, in the example of FIG. 1, application 8 may be a news application. As such, display component 6 of computing device 4 may output graphical user interface 12A that may show a specific user-selected news story. In the example of FIG. 1, graphical user interface 12A includes a news story accompanied with a related video 14 that is not currently playing or causing audio to be output. Further, computing device 4 is not currently outputting any audio for playback at audio output component 7. For instance, computing device 4 is not currently outputting any audio related to video 14 for playback at audio output component 7.

Computing device 4 may receive an indication of user input 16 to adjust a volume level of the computing device. Computing device 4 may have various structures capable of receiving the indication of user input 16. For instance, computing device 4 may include a button in the housing of computing device 4 that a user may press to adjust volume levels of audio output component 7. In other instances, presence-sensitive input component 5 may be capable of receiving user input 16 as a finger or stylus tap on or near the surface of presence-sensitive input component 5. Further, depending on the specific indication received, computing device 4 may increase the volume of audio output component 7, decrease the volume of audio output component 7, mute the volume of audio output component 7, or bring the volume of audio output component 7 to some other predefined level, such as a maximum volume.

Responsive to receiving user input 16, context module 11 may determine context data based on the content of graphical user interface 12A associated with application 8, which is currently executing on computing device 4. For instance, as described above, the content associated with the news application 8 may include video 14. Context module 11 may determine the context data as any possible audio that could be output on the current content. For instance, in the example of FIG. 1, computing device 4 may be capable of outputting audio associated with video 14, a ringtone, a text message tone, an alert tone, or an alarm tone. The context data may further include what necessary action must occur for the respective audio to be output. For instance, for audio associated with video 14 to be output, computing device 4 may need to receive a second indication of user input to select video 14 in graphical user interface 12A using presence-sensitive input component 5. In another instance, for audio associated with the text message tone to be output, computing device 4 must receive an incoming text message.

Context module 11 may predict, based at least in part on the context data, a type of audio that is planned to be output for playback at audio output component 7. The type of audio may be one of a plurality of types of audio capable of being output for playback at audio output component 7, such as audio associated with one of video 14, a ringtone, a text message tone, an alert tone, or an alarm tone. For instance, context module 11 may determine, based on the determined context data, which type of audio is most likely to be output next. For instance, since graphical user interface 12A includes video 14, context module 11 may predict that audio associated with video 14 is most likely to be output for playback at audio output component 7. In other instances, if a user has been sending a large amount of text messages in a relatively short amount of time close to a time that graphical user interface 12A is displayed, context module 11 may predict that audio associated with the text message tone is most likely to be output for playback at audio output component 7.

Volume module 10 may adjust, based at least in part on the predicted type of audio, a respective level of a volume associated with the type of audio. For instance, in the example of FIG. 1, context module 11 may predict that audio associated with video 14 is most likely to be output for playback at audio output component 7. As such, volume module 10 may adjust a media volume level based on user input 16 (i.e., whether user input 16 increases or decreases the volume level).

In some instances, such as the instance shown in graphical user interface 12B, volume module 10 may output for display, at display component 6, a graphical indication of the volume adjustment. For instance, volume module 10 may output graphical box 18 that shows the volume type (i.e., the media volume) and a volume bar to show the level of the respective volume type, as well as the volume adjustment.

For instance, in graphical box 18, the media volume level may have previously been at point 19A. After the indication of user input 16 is received by computing device 4, volume module 10 may adjust the volume such that the new media volume level is at point 19B. Graphical user interface 12B may display an animation showing a transition between those two points, or may merely show the volume level to be at point 19B.

Rather than merely adjusting the volume of a default volume type or the volume associated with audio actually being output by the computing device, by predicting the type of volume a user may want to adjust, computing device 4 may provide a more responsive and efficient user interface. Computing device 4 may proactively adjust volume for media about to be played rather than waiting for the media to actually be played. Proactively adjusting the volume to a desired level prior to outputting audio associated with that volume further reduces instances where the user unknowingly adjusts the wrong volume and outputs audio in the future at an undesired level.

Throughout the disclosure, examples are described where a computing device and/or a computing system may analyze information (e.g., locations, speeds, the content of the user interface, etc.) associated with a computing device only if the computing device receives permission from the user to analyze the information. For example, in situations discussed below in which the computing device may collect or may make use of information associated with the user, the user may be provided with an opportunity to provide input to control whether programs or features of the computing device can collect and make use of user information (e.g., information about a user's current location, current speed, etc.), or to dictate whether and/or how to the computing device may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

Figure 2:
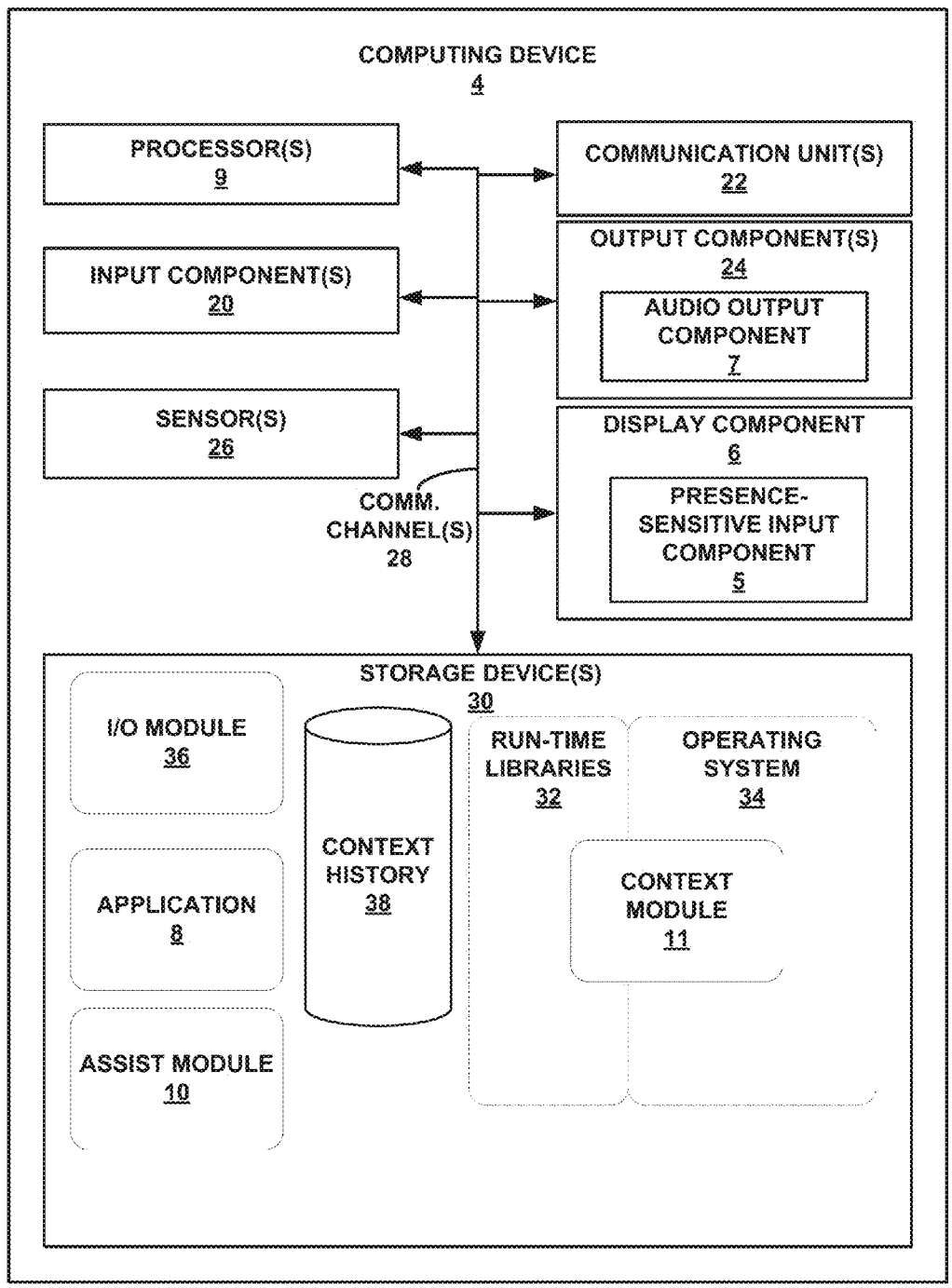
FIG. 2 is a block diagram illustrating further details of the example computing device of FIG. 1, in accordance with one or more aspects of the present disclosure.

FIG. 2 is a block diagram illustrating further details of the example computing device of FIG. 1, in accordance with one or more aspects of the present disclosure. FIG. 2 illustrates only one particular example of computing device 4, and many other examples of computing device 4 may be used in other instances.

As shown in the specific example of FIG. 2, computing device 4 includes one or more processors 9, one or more input components 20, one or more communication units 22, one or more output components 24, one or more storage devices 30, one or more sensors 26, audio output component 7, display component 6, and presence-sensitive input component 5. Computing device 4, in the example of FIG. 2 includes application 8, assist module 10, context module 11, run-time libraries 32, operating system 34, and I/O module 36. Each of components 5, 6, 9, 20, 22, 24, and 26 may be interconnected (physically, communicatively, and/or operatively) for inter-component communications. In some examples, communication channels 28 may include a system bus, network connection, inter-process communication data structure, or any other channel for communicating data. As one example in FIG. 2, components 5, 6, 9, 20, 22, 24, and 26 may be coupled by one or more communication channels 28. Application list 8, assist module 10, context module 11, run-time libraries 32, operating system 34, and I/O module 36 may also communicate information with one another as well as with other components in computing device 4.

Processors 9, in one example, are configured to implement functionality and/or process instructions for execution within computing device 4. For example, processors 9 may be capable of processing instructions stored in storage device 30. Examples of processors 9 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 30 may be configured to store information within computing device 4 during operation. Storage device 30, in some examples, is described as a computer-readable storage medium. In some examples, storage device 30 is a temporary memory, meaning that a primary purpose of storage device 30 is not long-term storage. Storage device 30, in some examples, is described as a volatile memory, meaning that storage device 30 does not maintain stored contents when the computing device is turned off. Examples of volatile memories include random access memories (RAM), dynamic random access memories (DRAM), static random access memories (SRAM), and other forms of volatile memories known in the art. In some examples, storage device 30 is used to store program instructions for execution by processors 9. Storage device 30, in one example, is used by software or applications running on computing device 4 (e.g., application 8) to temporarily store information during program execution.

Storage devices 30, in some examples, also include one or more computer-readable storage media. Storage devices 30 may be configured to store larger amounts of information than volatile memory. Storage devices 30 may further be configured for long-term storage of information. In some examples, storage devices 30 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 4, in some examples, also includes one or more communication units 22. Computing device 4, in one example, utilizes communication unit 22 to communicate with external devices via one or more networks, such as one or more wired or wireless networks. Communication unit 22 may be a network interface card, such as an Ethernet card, an optical transceiver, a radio frequency transceiver, or any other type of device that can send and receive information. Examples of such network interfaces may include Bluetooth, infrared signaling, 3G, LTE, and Wi-Fi radios as well as Universal Serial Bus (USB) and Ethernet. In some examples, computing device 4 utilizes communication unit 22 to wirelessly communicate with another computing device that is operably coupled to computing device 4.

Computing device 4, in one example, also includes one or more input components 20. Input component 20, in some examples, is configured to receive input from a user through tactile, audio, or video feedback. Examples of input component 20 include a display component, a mouse, a keyboard, a camera, a microphone or any other type of device for detecting input from a user. In some examples, a display component includes a touch-sensitive screen.

One or more output components 24 may also be included in computing device 4. Output component 24, in some examples, is configured to provide output to a user using tactile, audio, or video stimuli. Output component 24, in one example, includes an electronic display, a loudspeaker, or any other type of device for converting a signal into an appropriate form understandable to humans or machines. The electronic display may be an LCD or OLED part of a touch screen, may be a non-touchscreen direct view display component such as a CRT, LED, LCD, or OLED. The display component may also be a projector instead of a direct view display.

In some examples, display component 6 may include functionality of input component 20 and/or output component 24. In the example of FIG. 2, display component 6 may be configured to output graphical content on the display and receive indications of user input via presence-sensitive input component 5. In some examples, presence-sensitive input component 5 may detect an object at and/or near the screen of the display component. As one example range, presence-sensitive input component 5 may detect an object, such as a finger or stylus that is within 2 inches (~5.08 centimeters) or less of the physical screen of display component 6. Presence-sensitive input component 5 may determine a location (e.g., an (x,y) coordinate) of display component 6 at which the object was detected. In another example range, presence-sensitive input component 5 may detect an object 6 inches (~15.24 centimeters) or less from the physical screen of display component 6 and other exemplary ranges are also possible. Presence-sensitive input component 5 may determine the location of the display selected by a user's finger using capacitive, inductive, and/or optical recognition techniques. In some examples, presence-sensitive input component 5 provides output to a user using tactile, audio, or video stimuli as described with respect to output component 24.

Computing device 4 may include operating system 34. Operating system 34, in some examples, controls the operation of components of computing device 4. For example, operating system 34, in one example, facilitates the communication of application 8, assist module 10, context module 11, run-time libraries 32, and input/output (I/O) module 36 with processors 9, communication unit 22, storage device 30, input component 20, output component 24, display component 6, and presence-sensitive input component 5. One or more components of storage devices 30 including application 8, assist module 10, context module 11, run-time libraries 32, operating system 34, and I/O module 36 may each include program instructions and/or data that are executable by computing device 4. As one example, display component 6 may include instructions that cause computing device 4 to perform one or more of the operations and actions described in the present disclosure. In some examples, one or more of the components illustrated in storage device 30 may be implemented in hardware and/or a combination of software and hardware.

In some examples, computing device 4 may include one or more sensors 26. One or more of sensors 26 may measure one more measurands. Examples of one or more of sensors 26 may include one or more position sensors (e.g., a global positioning system (GPS) sensor, an indoor positioning sensor, or the like), one or more motion/orientation sensors (e.g., an accelerometer, a gyroscope, or the like), a light sensor, a temperature sensor, a pressure (or grip) sensor, a physical switch, a proximity sensor, and one or more biosensors that can measure properties of the skin/blood, such as alcohol, blood sugar etc.

I/O module 36 may receive and interpret inputs detected at display component 6 (e.g., as a user provides one or more gestures at one or more locations of display component 6 at which a user interface is displayed) and input detected at other input components of computing device 4 (e.g., microphones, cameras, sensors, physical buttons, etc.). I/O module 36 may relay information about the input detected at computing device 4 to one or more associated platforms, applications, and/or services executing at computing device 4, to cause computing device 4 to perform functions. For example, based on received input, I/O module 36 may initiate the techniques described herein. In one example, a user may perform an action that initiates the techniques on all of the content in the graphical user interface. In another example, the user may select a particular piece of content displayed in the graphical user interface for which the techniques will be performed.

I/O module 36 also may receive information and instructions from one or more associated platforms, applications, and/or services executing at computing device 4 (e.g., assist module 10, etc.) for generating a graphical user interface or for providing a somatosensory type user interface. In addition, I/O module 36 may act as a respective intermediary between the one or more associated platforms, operating systems, applications, and/or services executing at computing device 4 and various output components of computing device 4 (e.g., display component 6, one or more sensors 26, storage devices 30, audio output component 7 (e.g., a speaker), an LED indicator, other output components, etc.) to produce output (e.g., a graphic, a flash of light, a sound, a somatosensory response, a haptic response, etc.) with computing device 4.

In accordance with techniques of this disclosure, display component 6 of computing device 4 may output a graphical user interface as generated by application 8. To illustrate, in the example of FIG. 2, application 8 may be a music streaming application. As such, display component 6 of computing device 4 may output a graphical user interface that may show a specific user-selected news story. In the example of FIG. 2, the graphical user interface may include a number of song choices and artist information, where the songs are not currently playing or causing audio to be output. Further, computing device 4 is not currently outputting any audio for playback at audio output component 7.

I/O module 36 of computing device 4 may receive an indication of user input to adjust a volume level of the computing device. Computing device 4 may have various structures capable of receiving the indication of user input. For instance, input component 20 may include a button in the housing of computing device 4 that a user may press to adjust volume levels of audio output component 7. In other instances, presence-sensitive input component 5 may be capable of receiving the indication of the user input as a finger or stylus tap on or near the surface of presence-sensitive input component 5. Further, depending on the specific indication received, computing device 4 may increase the volume of audio output component 7, decrease the volume of audio output component 7, mute the volume of audio output component 7, or bring the volume of audio output component 7 to some other pre-defined level, such as a maximum volume.

Responsive to receiving the user input, context module 11 may determine context data based on the content of the graphical user interface associated with application 8, which is currently executing on computing device 4. For instance, as described above, the content associated with the music streaming application 8 may include songs that may be chosen for playback at audio component 7. Context module 11 may determine the context data as any possible audio that could be output on the current content. For instance, in the example of FIG. 2, computing device 4 may be capable of outputting audio associated with any of the song choices, a ringtone, a text message tone, an alert tone, or an alarm tone. The context data may further include what necessary action must occur for the respective audio to be output. For instance, for audio associated with one of the displayed song choices to be output, computing device 4 may need to receive a second indication of user input to select the respective song choice in the graphical user interface using presence-sensitive input component 5. In another instance, for audio associated with the alarm tone to be output, time must progress until it is currently a pre-programmed alarm time.

In order to make this determination, context module 11 may operate with access to run-time libraries 32 and operating system 34 in order to determine how computing device 4 may respond to various pieces of content being output via application 8. For instance, context module 11 may detect one or more objects present in the content. In the example of FIG. 2, each of the song choices may be a particular object that includes descriptions of the respective song and audio of the respective song. Other objects may include textual information about the songs or the application, as well as any underlying objects present in operating system 34. Context module 11 may determine a data type for each of the one or more objects present in the content. For instance, with each of the song choices, the audio data present in the respective objects may have a data type associated with music. Further, the purely textual or graphical objects may have other data types, such as strings or images.

Context module 11 may predict, based at least in part on the context data, a type of audio that is planned to be output for playback at audio output component 7. The type of audio may be one of a plurality of types of audio capable of being output for playback at audio output component 7, such as audio associated with one of the song choices in application 8, a ringtone, a text message tone, an alert tone, or an alarm tone. In general, the respective volume may be any of a media volume, a music volume, a video volume, a podcast volume, a ringtone volume, a text message volume, an alert tone volume, an alarm tone volume, or a touch tone volume. For instance, context module 11 may determine, based on the determined context data, which type of audio is most likely to be output next. For instance, since the graphical user interface described with respect to FIG. 2 includes a plurality of song choices, context module 11 may predict that audio associated with any of the choices is most likely to be output for playback at audio output component 7. In other instances, if the time is within a certain amount of time of the pre-programmed alarm time, such as within 5 minutes, context module 11 may predict that audio associated with the alarm tone is most likely to be output for playback at audio output component 7.

In predicting the type of audio, context module 11 may refer back to the data types of the objects detected above. For instance, context module 11 may determine whether a respective object of the one or more objects includes audio capable of being output for playback at audio output device 7. Responsive to determining that the respective object includes the audio, context module 11 may predict, based at least in part on the respective object and a context history associated with application 8, the type of audio. For instance, context module 11 may determine that textual or graphical objects that do not contain audio data may be disregarded. Conversely, context module 11 may determine that the music objects that contain the audio data associated with the music volume have audio capable of being output for playback at audio output component 7. Context module may then predict the music volume.

In some examples, the context history may include a likelihood that the type of audio will be output when application 8 is currently executing on computing device 4. This context history may be updated based on how the user interacts with application 8. For instance, based on the context history indicating that there is a 60% chance that the user intends to play a song when application 8 outputting the particular content for display at display component 6, context module 11 may predict that the user intends to adjust the music volume. As such, computing device 4 may proactively adjust volume for media about to be played rather than waiting for the media to actually be played. After adjusting the music volume. I/O module 36 may receive a second indication of user input. Operating system 34 may determine an operation to perform based at least in part on the second indication of user input. Context module 11 may update the context history based at least in part on the operation. For instance, if operating system 34 plays a song in response to receiving the second indication of user input, context module 11 may update the context history to indicate that there is now a 65% chance that the user intends to play a song when application 8 is outputting the particular content for display at display component 6. Conversely, if operating system 34 terminates the execution of application 8 in response to receiving the second indication of user input, context module 11 may update the context history to indicate that there is now only a 55% chance that the user intends to play a song when application 8 is outputting the particular content for display at display component 6.

In some examples, when context module 11 updates the context history, context module 11 may reference an aggregated context history associated with application 8. The aggregated context history includes a plurality of context histories, such as an average of the plurality of context histories, where each context history of the plurality of context histories is associated with a respective computing device different than computing device 4. Context module 11 may further update the context history based on the aggregated context history. For instance, the context history may indicate that there is a 60% chance that the user intends to play a song when application 8 is displaying the particular content. Context module 11 may receive an aggregated context history from a remote server device that, after recording the behavior of multiple users over an extended period of time, indicates that there is an 80% chance that the user intends to play a song when application 8 is outputting the particular content for display at display component 6. Context module may update the context history based on this aggregated context history, such as by adjusting the local context history to equal the aggregated context history or by averaging the local context history and the aggregated context history.

Volume module 10 may adjust, based at least in part on the predicted type of audio, a level of a respective volume associated with the type of audio. For instance, in the example of FIG. 2, context module 11 may predict that audio associated with one of the song choices is most likely to be output for playback at audio output component 7. As such, volume module 10 may adjust a level of a music volume based on the user input (i.e., whether the user input increases or decreases the volume level).

In some instances, I/O module 36 may output for display, at display component 6, a graphical indication of the volume adjustment. For instance, I/O module 36 may output a graphical box that shows the volume type (i.e., the music volume) and a volume bar to show the level of the respective volume type, as well as the volume adjustment. For instance, in the graphical box, the media volume level may have previously been at a first point. After the indication of the user input 16 received by I/O module 36 of computing device 4, volume module 10 may adjust the volume such that the new media volume level is at a second point. The graphical user interface may display an animation showing a transition between those two points, or may merely show the volume level to be at the second point.

In some instances, within the same application 8, context module 11 may predict a different volume type to adjust. For instance, when application 8 is a music streaming application, application 8 may output a graphical user interface showing biographical information of a particular artist for display at display component 6. From this user interface, there may not exist any options to play a song. When display component 6 is displaying this graphical user interface, I/O module 36 may receive a second indication of user input to adjust a volume level of computing device 4. Responsive to receiving the second indication of user input, context module 11 may determine context data based on the second content (i.e., the page displaying the artist's biographical information). Context module 11 may determine that no audio data is present on this biographical page. As such, volume module 10 may adjust a level of a volume different than the music volume, such as the alarm tone volume or the ringtone volume.

In other instances, an application different than application 8 may be executing on computing device 4, and the application may output a graphical user interface that does not contain any audio data. For instance, the application may be operating system 34 itself, and the graphical user interface may be a home screen. In such instances, I/O module 36 may receive a second indication of user input to adjust a volume level of computing device 4. Responsive to receiving the second indication of user input, context module 11 may determine context data based on the second content (i.e., the home page). Context module 11 may determine that no audio data is present on this home page. As such, volume module 10 may adjust a volume different than the music volume, such as the text tone volume or the ringtone volume.

In some examples, after adjusting the level of the respective volume, computing device 4 may receive an indication of user input to perform an operation other than outputting the predicted audio. For instance, in the example of FIG. 2, I/O module 36 may receive a second indication of user input to terminate application 8 and return to the home screen, foregoing the output of any of the songs displayed by display component 6. In such examples, volume module 10 may revert the music volume to a level of the music volume prior to the adjustment of the music volume. In some instances, volume module 10 may further adjust a level of a second volume different than the respective volume. For instance, volume module 10 may adjust whichever volume was second in the context history responsive to the second indication of user input not outputting the detected audio, such as the text message tone or the alarm tone.

Figure 3:
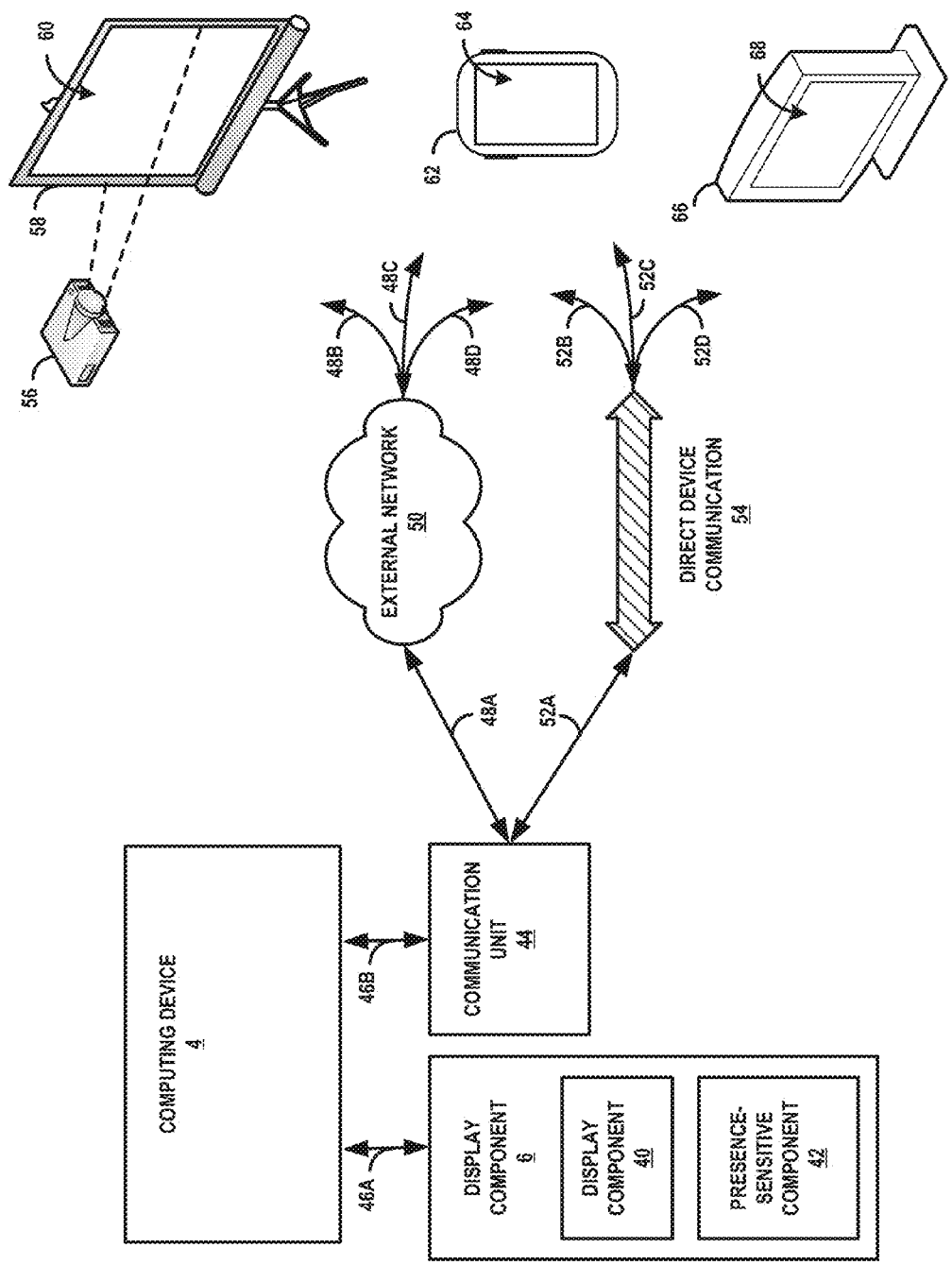
FIG. 3 is a block diagram illustrating an example system that includes a computing device that outputs screen content for display at a remote device, in accordance with one or more techniques of the present disclosure.

FIG. 3 is a block diagram illustrating an example system that includes a computing device that outputs screen content for display at a remote device, in accordance with one or more techniques of the present disclosure. Screen content, generally, may include any visual information that may be output for display, such as text, images, a group of moving images, etc. The example shown in FIG. 3 includes a computing device 4, display component 6, communication unit 22, projector 56, projector screen 58, mobile device 62, and visual display component 66. Although shown for purposes of example in FIGS. 1 and 2 as a stand-alone computing device 4, a computing device such as computing device 4 may, generally, be any component or system that includes a processor or other suitable computing environment for executing software instructions and, for example, need not include a display component.

As shown in the example of FIG. 3, computing device 4 may be a processor that includes functionality as described with respect to processor 9 in FIG. 2. In such examples, computing device 4 may be operatively coupled to display component 6 by a communication channel 46A, which may be a system bus or other suitable connection. Computing device 4 may also be operatively coupled to communication unit 22, further described below, by a communication channel 46B, which may also be a system bus or other suitable connection. Although shown separately as an example in FIG. 3, computing device 4 may be operatively coupled to display component 6 and communication unit 22 by any number of one or more communication channels.

In other examples, such as illustrated previously by computing device 4 in FIG. 1 and computing device 4 in FIG. 2, a computing device may refer to a portable or mobile device such as a mobile phone (including smart phone), laptop computer, smartwatch, etc. In some examples, a computing device may be a desktop computer, tablet computer, smart television platform, gaming console, remote controller, electronic camera, personal digital assistant (PDA), server, mainframe, etc.

Display component 6, like display component 6 as shown in FIG. 1, may include display component 40 and presence-sensitive input component 42. Display component 40 may, for example, receive data from computing device 4 and display the screen content. In some examples, presence-sensitive input component 42 may determine one or more user inputs (e.g., continuous gestures, multi-touch gestures, single-touch gestures, etc.) at display component 6 using capacitive, inductive, and/or optical recognition techniques and send indications of such user input to computing device 4 using communication channel 46A. In some examples, presence-sensitive input component 42 may be physically positioned on top of display component 40 such that, when a user positions an input unit over a graphical element displayed by display component 40, the location at which presence-sensitive input component 42 corresponds to the location of display component 40 at which the graphical element is displayed. In other examples, presence-sensitive input component 42 may be positioned physically apart from display component 40, and locations of presence-sensitive input component 42 may correspond to locations of display component 40, such that input can be made at presence-sensitive input component 42 for interacting with graphical elements displayed at corresponding locations of display component 40.

As shown in FIG. 3, computing device 4 may also include and/or be operatively coupled with communication unit 22. Communication unit 22 may include functionality of communication unit 22 as described in FIG. 2. Examples of communication unit 22 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 4 may also include and/or be operatively coupled with one or more other devices, e.g., input components, output components, memory, storage devices, etc. that are not shown in FIG. 3 for purposes of brevity and illustration.

FIG. 3 also illustrates a projector 56 and projector screen 58. Other such examples of projection devices may include electronic whiteboards, holographic display components, and any other suitable devices for displaying screen content. Projector 56 and projector screen 58 may include one or more communication units that enable the respective devices to communicate with computing device 4. In some examples, the one or more communication units may enable communication between projector 56 and projector screen 58. Projector 56 may receive data from computing device 4 that includes screen content. Projector 56, in response to receiving the data, may project the screen content onto projector screen 58. In some examples, projector 56 may determine one or more user inputs (e.g., continuous gestures, multi-touch gestures, single-touch gestures, etc.) at projector screen using optical recognition or other suitable techniques and send indications of such user input using one or more communication units to computing device 4. In such examples, projector screen 58 may be unnecessary, and projector 56 may project screen content on any suitable medium and detect one or more user inputs using optical recognition or other such suitable techniques.

Projector screen 58, in some examples, may include a presence-sensitive display 60. Presence-sensitive display 60 may include a subset of functionality or all of the functionality of display component 6 as described in this disclosure. In some examples, presence-sensitive display 60 may include additional functionality. Projector screen 58 (e.g., an electronic whiteboard), may receive data from computing device 4 and display the screen content. In some examples, presence-sensitive display 60 may determine one or more user inputs (e.g., continuous gestures, multi-touch gestures, single-touch gestures, etc.) at projector screen 58 using capacitive, inductive, and/or optical recognition techniques and send indications of such user input using one or more communication units to computing device 4.

FIG. 3 also illustrates mobile device 62 and visual display component 66. Mobile device 62 and visual display component 66 may each include computing and connectivity capabilities. Examples of mobile device 62 may include e-reader devices, convertible notebook devices, hybrid slate devices, etc. Examples of visual display component 66 may include other semi-stationary devices such as televisions, computer monitors, etc. As shown in FIG. 3, mobile device 62 may include a presence-sensitive display 64. Visual display component 66 may include a presence-sensitive display 68. Presence-sensitive displays 64, 68 may include a subset of functionality or all of the functionality of display component 6 as described in this disclosure. In some examples, presence-sensitive displays 64, 68 may include additional functionality. In any case, presence-sensitive display 64, for example, may receive data from computing device 4 and display the screen content. In some examples, presence-sensitive display 68 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 4.

As described above, in some examples, computing device 4 may output screen content for display at display component 6 that is coupled to computing device 4 by a system bus or other suitable communication channel. Computing device 4 may also output screen content for display at one or more remote devices, such as projector 56, projector screen 58, mobile device 62, and visual display component 66. For instance, computing device 4 may execute one or more instructions to generate and/or modify screen content in accordance with techniques of the present disclosure. Computing device 4 may output the data that includes the screen content to a communication unit of computing device 4, such as communication unit 22. Communication unit 22 may send the data to one or more of the remote devices, such as projector 56, projector screen 58, mobile device 62, and/or visual display component 66. In this way, computing device 4 may output the screen content for display at one or more of the remote devices. In some examples, one or more of the remote devices may output the screen content at a display component that is included in and/or operatively coupled to the respective remote devices.

In some examples, computing device 4 may not output screen content at display component 6 that is operatively coupled to computing device 4. In other examples, computing device 4 may output screen content for display at both a display component 6 that is coupled to computing device 4 by communication channel 46A, and at one or more remote devices. In such examples, the screen content may be displayed substantially contemporaneously at each respective device. For instance, some delay may be introduced by the communication latency to send the data that includes the screen content to the remote device. In some examples, screen content generated by computing device 4 and output for display at display component 6 may be different than screen content display output for display at one or more remote devices.

Computing device 4 may send and receive data using any suitable communication techniques. For example, computing device 4 may be operatively coupled to external network 50 using network link 48A. Each of the remote devices illustrated in FIG. 3 may be operatively coupled to external network 50 by one of respective network links 48B, 48C, and 48D. External network 50 may include network hubs, network switches, network routers, etc., that are operatively inter-coupled thereby providing for the exchange of information between computing device 4 and the remote devices illustrated in FIG. 3. In some examples, network links 48A-48D may be Ethernet, ATM or other network connections. Such connections may be wireless and/or wired connections.

In some examples, computing device 4 may be operatively coupled to one or more of the remote devices included in FIG. 3 using direct device communication 54. Direct device communication 54 may include communications through which computing device 4 sends and receives data directly with a remote device, using wired or wireless communication. That is, in some examples of direct device communication 54, data sent by computing device 4 may not be forwarded by one or more additional devices before being received at the remote device, and vice-versa. Examples of direct device communication 54 may include Bluetooth, Near-Field Communication, Universal Serial Bus, WiFi, infrared, etc. One or more of the remote devices illustrated in FIG. 3 may be operatively coupled with computing device 4 by communication links 52A-52D. In some examples, communication links 52A-52D may be connections using Bluetooth, Near-Field Communication, Universal Serial Bus, infrared, etc. Such connections may be wireless and/or wired connections.

As discussed above, computing device 4 may not be currently outputting audio for playback at an audio output device operatively coupled to computing device 4 and may output, for display at a display component (e.g., projector 56, mobile device 62, or visual display component 66) a graphical user interface of an application. Computing device 4 may receive an indication of user input to adjust a volume level of computing device 4. Responsive to receiving the indication of user input, computing device 4 may determine context data based on content associated with an application currently executing on computing device 4. Computing device 4 may then predict a type of audio that is planned to be output for playback at the audio output device based at least in part on the context data. The type of audio may be one of a plurality of types of audio capable of being output for playback at the audio output device. Computing device 4 may adjust a level of a respective volume associated with the type of audio based at least in part on the type of audio.

FIGS. 4A-4D are conceptual diagrams illustrating example graphical user interfaces of a computing device that retroactively adjusts volume types based on updated user input, in accordance with one or more aspects of the present disclosure. The techniques of FIGS. 4A-4D may be performed by one or more processors of a computing device, such as computing device 4 and 4 illustrated in FIG. 1 and FIG. 2. For purposes of illustration, the techniques of FIGS. 4A-4D are described within the context of computing device 4 of FIG. 1, although computing devices having configurations different than that of computing device 4 may perform the techniques of FIGS. 4A-4D.

Figure 4A:
FIGS. 4A-4D are conceptual diagrams illustrating example graphical user interfaces of a computing device that retroactively adjusts volume types based on updated user input, in accordance with one or more aspects of the present disclosure.
Figure 4B:
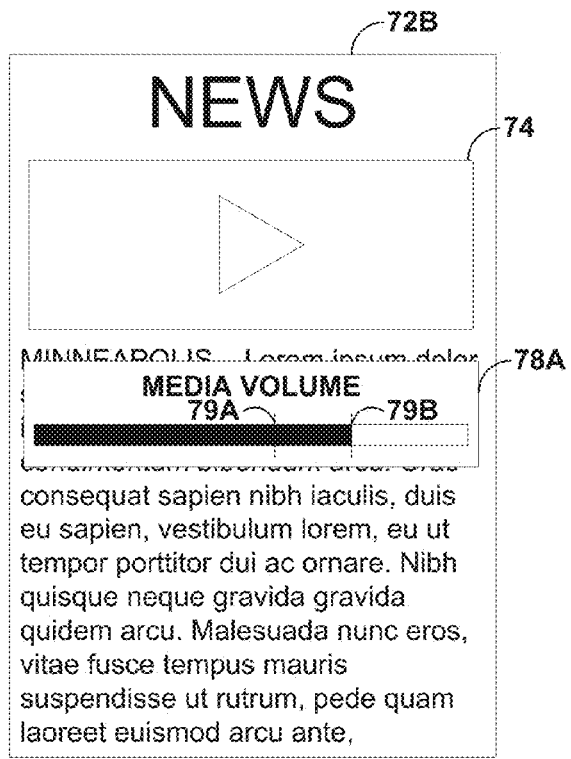
Figure 4C:
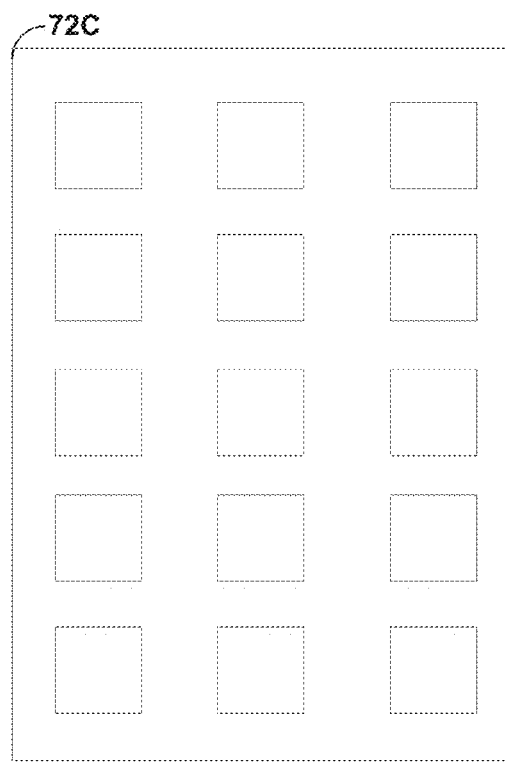

In FIG. 4A, Computing device 4 may output graphical user interface 72A of a news application that includes video 74. Responsive to receiving a first indication of user input, computing device 4 determines context data from the content associated with graphical user interface 72A. Based on the context data and the received indication of user input, computing device 4 may increase a media volume from point 79A to point 79B, as depicted in graphical box 78A in graphical user interface 72B of FIG. 4B.

In some examples, after adjusting the media volume, computing device 4 may receive a second indication of user input 76B to perform an operation other than outputting the predicted audio. For instance, in the example of FIG. 4C, computing device 4 may receive a second indication of user input to terminate the news application and return to the home screen (i.e., graphical user interface 72C) without outputting any audio related to video 74. In such examples, computing device 4 may revert the media volume to a level of the media volume prior to the adjustment of the media volume (i.e., reverting the media volume from point 79B to point 79A).

Figure 4D:
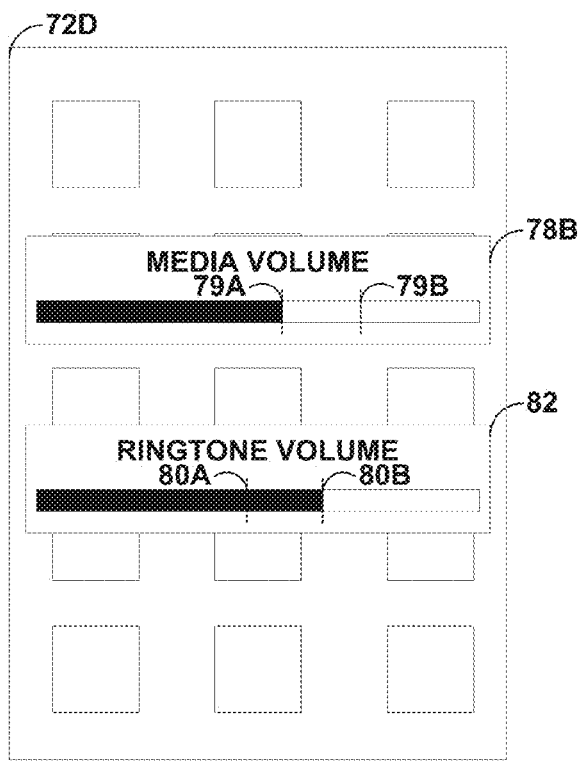

In some examples, computing device 4 may further adjust a level of a second volume different than the respective volume. For instance, in the example of FIG. 4D, computing device 4 may adjust a text tone volume, which may be second in the context history associated with the news application to the media volume. As shown in FIG. 4D, computing device 4 may adjust the text tone volume from point 80A to point 80B, and output graphical box 82 to show the adjustment.

In other instances, computing device 4 may determine which volume to adjust based on information other than the context history of the previously displayed content and application. For instance, computing device 4 may determine context data for the newly displayed content associated with the currently executing application, which may be either the same application or a newly executing application.

Computing device 4 may then determine a new volume type to adjust based on the newly determined context data, in accordance with the techniques described herein. In other instances, computing device 4 may automatically revert to the level of a system volume or some other default volume, such as a ringtone or a text tone.

Figure 5:
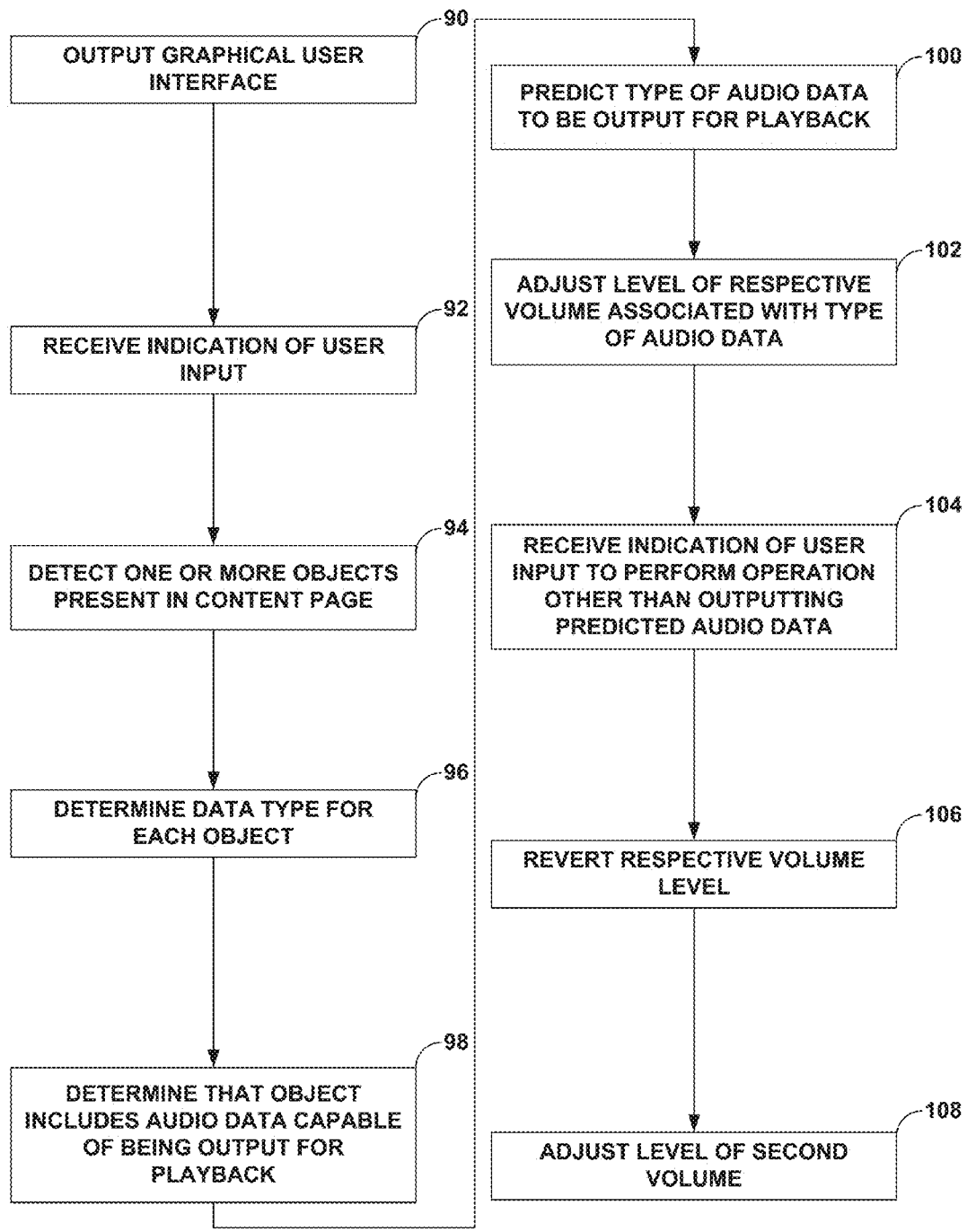
FIG. 5 is a flow diagram illustrating example operations of a computing device that implements techniques for determining volume types to adjust, in accordance with one or more aspects of the present disclosure.

FIG. 5 is a flow diagram illustrating example operations of a computing device that implements techniques for determining volume types to adjust, in accordance with one or more aspects of the present disclosure. The techniques of FIG. 5 may be performed by one or more processors of a computing device, such as computing device 4 illustrated in FIG. 1 and FIG. 2. For purposes of illustration, the techniques of FIG. 5 are described within the context of computing device 4 of FIG. 1, although computing devices having configurations different than that of computing device 4 may perform the techniques of FIG. 5. One or more of the steps described may be optional and not every step described/shown in the flow diagram of FIG. 5 is required to perform the techniques of this disclosure In accordance with techniques of this disclosure, display component 6 of computing device 4 may output a graphical user interface as generated by application 8 (90). Computing device 4 may receive an indication of user input to adjust a volume level of the computing device (92). For instance, the user input may include a button press if computing device 4 includes a button in the housing of computing device 4 that a user may press to adjust volume levels of audio output component 7. In other instances, when display component 6 is a touch-screen component capable of receiving indications of user input, the user input may include a finger or stylus tap on display component 6. In general, the user input may be any input received by computing device 4 suitable for increasing or decreasing volume of the computing device. Further, the user input, depending on the specific indication received, may be a request to increase the volume of audio output component 7, decrease the volume of audio output component 7, mute the volume of audio output component 7, or bring the volume of audio output component 7 to some other pre-defined level, such as a maximum volume.

Responsive to receiving user input 16, context module 11 may determine context data based on the content of the graphical user interface associated with application 8, which is currently executing on computing device 4. The context data may further include what necessary action must occur for the respective audio to be output.

In order to make this determination, context module 11 may operate with access to run-time libraries and the operating system in order to determine how computing device 4 may respond to various pieces of content being output via application 8. For instance, context module 11 may detect one or more objects present in the content (94). Context module 11 may determine a data type for each of the one or more objects present in the content (96).

Context module 11 may predict, based at least in part on the context data, a type of audio that is planned to be output for playback at audio output component 7. In general, the respective volume may be any of a media volume, a music volume, a video volume, a podcast volume, a ringtone volume, a text message volume, an alert tone volume, an alarm tone volume, or a touch tone volume. For instance, context module 11 may determine, based on the determined context data, which type of audio is most likely to be output next.

In predicting the type of audio, context module 11 may refer back to the data types of the objects detected above. For instance, context module 11 may determine whether a respective object of the one or more objects includes audio capable of being output for playback at audio output device 7 (98). Responsive to determining that the respective object includes the audio, context module 11 may predict, based at least in part on the respective object and a context history associated with application 8, the type of audio (100).

In some examples, the context history may include a likelihood that the type of audio will be output when application 8 is currently executing on computing device 4. This context history may be updated based on how the user interacts with application 8. For instance, context module 11 may predict that the user intends to adjust the level of the respective volume. After adjusting the level of the respective volume, computing device 4 may receive a second indication of user input. Computing device 4 may determine an operation to perform based at least in part on the second indication of user input. Context module 11 may update the context history based at least in part on the operation. For instance, if the operation includes outputting the audio for playback at audio output device 7, updating the context history may include increasing the likelihood that the type of audio will be output when application 8 is currently executing on computing device 4. In other instances, if the operation includes an operation other than outputting the audio for playback at audio output device 7, updating the context history may include decreasing the likelihood that the type of audio will be output when application 8 is currently executing on computing device 4.

In some examples, when context module 11 updates the context history, context module 11 may reference an aggregated context history associated with application 8. The aggregated context history includes a plurality of context histories, such as an average of the plurality of context histories, where each context history of the plurality of context histories is associated with a respective computing device different than computing device 4. Context module 11 may further update the context history based on the aggregated context history. Context module may update the context history based on this aggregated context history, such as by adjusting the local context history to equal the aggregated context history or by averaging the local context history and the aggregated context history.

Volume module 10 may adjust, based at least in part on the predicted type of audio, a level of a respective volume associated with the type of audio (102). As such, computing device 4 may proactively adjust volume for media about to be played rather than waiting for the media to actually be played. In some instances, computing device 4 may output for display, at display component 6, a graphical indication of the volume adjustment. For instance, computing device 4 may output a graphical box that shows the volume type and a volume bar to show the level of the respective volume type, as well as the volume adjustment. For instance, in the graphical box, the media volume may have previously been at a first point. After the indication of the user input 16 received by computing device 4, volume module 10 may adjust the volume such that the new respective volume level is at a second point. The graphical user interface may display an animation showing a transition between those two points, or may merely show the volume level to be at the second point.

In some instances, within the same application 8, context module 11 may predict a different volume type to adjust. For instance, application 8 may output a graphical user interface without any audio data included. When this graphical user interface is being displayed, computing device 4 may receive a second indication of user input to adjust a volume level of computing device 4. Responsive to receiving the second indication of user input, context module 11 may determine context data based on the second content. Context module 11 may determine that no audio data is present on the second content based at least in part on the context data. As such, volume module 10 may adjust a volume different than the respective volume level.

In other instances, an application different than application 8 may be executing on computing device 4, and the application may output a graphical user interface that does not contain any audio data. In such instances, computing device 4 may receive a second indication of user input to adjust a volume level of computing device 4. Responsive to receiving the second indication of user input, context module 11 may determine context data based on the second content. Context module 11 may determine that no audio data is present on the second content based at least in part on the context data. As such, volume module 10 may adjust a level of a volume different than the respective volume.

In some examples, after adjusting the level for the respective volume, computing device 4 may receive an indication of user input to perform an operation other than outputting the predicted audio (104). In such examples, volume module 10 may the level of the respective volume associated with the type of audio to an original level of the respective volume prior to adjusting the respective volume (106). In some instances, volume module 10 may further adjust a level of a second volume different than the respective volume (108).

For instance, volume module 10 may adjust whichever volume was second in the context history responsive to the second indication of user input not outputting the detected audio, such as the text message tone or the alarm tone. In other instances, computing device 4 may determine which volume to adjust based on information other than the context history of the previously displayed content and application. For instance, computing device 4 may determine context data for the newly displayed content associated with the currently executing application, which may be either the same application or a newly executing application. Computing device 4 may then determine a new volume type to adjust based on the newly determined context data, in accordance with the techniques described herein. In other instances, computing device 4 may automatically revert to a system volume level or some other default volume level, such as a ringtone or a text tone.

Example 1

A method comprising: receiving, by a computing device not currently outputting audio for playback at an audio output device operatively coupled to the computing device, an indication of a user input to adjust a volume level of the computing device; and responsive to receiving the indication of the user input: determining, by the computing device, context data based on content associated with an application currently executing on the computing device; predicting, by the computing device and based at least in part on the context data, a type of audio that is planned to be output for playback at the audio output device, wherein the type of audio is one of a plurality of types of audio capable of being output for playback at the audio output device; and adjusting, by the computing device and based at least in part on the type of the audio, a level of a respective volume associated with the type of audio.

Example 2

The method of example 1, wherein the indication of user input is a first indication of user input, further comprising: receiving, by the computing device, an indication of a second user input to perform an operation different than outputting the audio for playback at the audio output device; and responsive to receiving the indication of the additional user input, reverting, by the computing device, the level of the respective volume associated with the type of audio to an original level of the respective volume prior to adjusting the respective volume.

Example 3

The method of example 2, further comprising: responsive to receiving the indication of the additional user input, adjusting, by the computing device, a level of a second volume different than the respective volume.

Example 4

The method of any of examples 1-3, wherein the indication of user input is a first indication of user input, wherein the content is a first content, the method further comprising: receiving, by the computing device not currently outputting audio for playback at the audio output device, a second indication of user input to adjust a volume level of the computing device; responsive to receiving the second indication of the user input: determining, by the computing device, context data based on a second content associated with the application currently executing on the computing device; determining, by the computing device and based at least in part on the context data, that no audio data is present in the second content; and adjusting, by the computing device and based at least in part on the determination that no audio data is present in the second content, a level of a volume different than the respective volume associated with the type of audio.

Example 5

The method of any of examples 1-4, wherein the user input is a first user input, and wherein the application is a first application, the method further comprising: receiving, by the computing device not currently outputting audio for playback at the audio output device, an indication of a second user input to adjust a volume level of the computing device, wherein a second application is currently executing on the computing device; responsive to receiving the indication of the second user input: determining, by the computing device, context data based on content associated with the second application; determining, by the computing device and based at least in part on the context data based on the content associated with the second application, that no audio data is present in the content associated with the second application; and adjusting, by the computing device and based at least in part on the determination that no audio data is present in the content associated with the second application, a level of a volume level different than the respective volume associated with the type of audio.

Example 6

The method of any of examples 1-5, wherein the respective volume is one of a media volume, a music volume, a video volume, a podcast volume, a ringtone volume, a text message volume, an alert tone volume, an alarm tone volume, or a touch tone volume.

Example 7

The method of any of examples 1-6, wherein determining the context data comprises: detecting, by the computing device, one or more objects present in the content; and determining, by the computing device, a data type for each of the one or more objects present in the content.

Example 8

The method of example 7, wherein predicting the type of audio comprises: determining, by the computing device, whether a respective object of the one or more objects includes audio capable of being output for playback at the audio output device; and responsive to determining that the respective object includes the audio, predicting, based at least in part on the respective object and a context history associated with the application, the type of audio, wherein the context history comprises a likelihood that the type of audio will be output when the application is currently executing on the computing device.

Example 9

The method of example 8, wherein the indication of user input is a first indication of user input, the method further comprising: receiving, by the computing device, a second indication of user input; determining, by the computing device, an operation to perform based at least in part on the second indication of user input; and updating, by the computing device, the context history based at least in part on the operation.

Example 10

The method of example 9, wherein, responsive to the operation comprising outputting the audio for playback at the audio output device, updating the context history comprises increasing the likelihood that the type of audio will be output when the application is currently executing on the computing device, and wherein, responsive to the operation comprising an operation other than outputting the audio for playback at the audio device, updating the context history comprises decreasing the likelihood that the type of audio will be output when the application is currently executing on the computing device.

Example 11

The method of example 9, wherein updating the context history comprises: receiving, by the computing device, an aggregated context history associated with the application, wherein the aggregated context history comprises a plurality of context histories, and each respective context history in the plurality of context histories is associated with a respective computing device other than the computing device; and updating, by the computing device, the context history based at least in part on the operation and the aggregated context history.

Example 12

A computing device comprising: an audio output device; at least one processor; and at least one module, operable by the at least one processor to: receive, an indication of user input to adjust a volume level of the computing device, wherein the audio output device is not currently playing back audio output by the at least one processor; and responsive to receiving the indication of the user input: determine context data based on content associated with an application currently executing on the computing device; predict, based at least in part on the context data, a type of audio that is planned to be output for playback at the audio output device, wherein the type of audio is one of a plurality of types of audio capable of being output for playback at the audio output device; and adjust, based at least in part on the type of the audio, a level of a respective volume associated with the type of audio.

Example 13

The computing device of example 12, wherein the indication of user input is a first indication of user input, wherein the at least one module is further operable by the at least one processor to: receive an indication of a second user input to perform an operation different than outputting the audio for playback at the audio output device; and responsive to receiving the indication of the additional user input, revert the level of the respective volume associated with the type of audio to an original level of the respective volume prior to adjusting the respective volume.

Example 14

The computing device of example 13, wherein the at least one module is further operable by the at least one processor to: responsive to receiving the indication of the additional user input, adjust a level of a second volume different than the respective volume.

Example 15

The method of any of examples 12-14, wherein the indication of user input is a first indication of user input, wherein the content is a first content, wherein the at least one module is further operable by the at least one processor to: receive a second indication of user input to adjust a volume level of the computing device; responsive to receiving the second indication of the user input: determine context data based on a second content associated with the application currently executing on the computing device; determine, based at least in part on the context data, that no audio data is present in the second content; and adjust, based at least in part on the determination that no audio data is present in the second content, a volume level different than the respective volume level associated with the type of audio.

Example 16

The computing device of any of examples 12-15, wherein determining the context data comprises the at least one module being operable by the at least one processor to: detect one or more objects present in the content; and determine a data type for each of the one or more objects present in the content, and wherein predicting the type of audio comprises the at least one module being operable by the at least one processor to: determine whether a respective object of the one or more objects includes audio capable of being output for playback at the audio output device; and responsive to determining that the respective object includes the audio, predict, based at least in part on the respective object and a context history associated with the application, the type of audio, wherein the context history comprises a likelihood that the type of audio will be output when the application is currently executing on the computing device.

Example 17

The computing device of example 16, wherein the indication of user input is a first indication of user input, wherein the at least one module is further operable by the at least one processor to: receive a second indication of user input; determine an operation to perform based at least in part on the second indication of user input; and update the context history based at least in part on the operation.

Example 18

The computing device of example 17, wherein, responsive to the operation comprising outputting the audio for playback at the audio output device, the at least one module is further operable by the at least one processor to update the context history by increasing the likelihood that the type of audio will be output when the application is currently executing on the computing device, and wherein, responsive to the operation comprising an operation other than outputting the audio for playback at the audio device, the at least one module is further operable by the at least one processor to update the context history by decreasing the likelihood that the type of audio will be output when the application is currently executing on the computing device.

Example 19

The computing device of example 17, wherein updating the context history comprises the at least one module being operable by the at least one processor to: receive an aggregated context history associated with the application, wherein the aggregated context history comprises a plurality of context histories, and each respective context history in the plurality of context histories is associated with a respective computing device other than the computing device; and update the context history based at least in part on the operation and the aggregated context history.

Example 20

A computer-readable storage medium encoded with instructions that, when executed, cause at least one processor of a computing device to: receive, an indication of user input to adjust a volume level of the computing device, wherein the computing device is not currently outputting audio for playback at an audio output device operatively coupled to the computing device; and responsive to receiving the indication of the user input: determine context data based on content associated with an application currently executing on the computing device; predict, based at least in part on the context data, a type of audio that is planned to be output for playback at the audio output device, wherein the type of audio is one of a plurality of types of audio capable of being output for playback at the audio output device; and adjust, based at least in part on the type of the audio, a level of a respective volume associated with the type of audio.

Example 21

A device comprising means for performing the method of any combination of examples 1-11.

Example 22

A computer-readable storage medium encoded with instructions that, when executed, cause at least one processor of a computing device to perform the method of any combination of examples 1-11.

Example 23

A device comprising at least one module operable by one or more processors to perform the method of any combination of examples 1-11.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

The invention claimed is:

1. A method comprising:
receiving, by a computing device not currently outputting audio for playback at an audio output device operatively coupled to the computing device, an indication of a user input to adjust a volume level of the computing device;
responsive to receiving the indication of the user input and prior to adjusting the volume level of the computing device:
determining, by the computing device, context data based on content associated with an application currently executing on the computing device, wherein the context data includes playable audio of the content and an action required to output the playable audio at the audio output device; and
predicting, by the computing device and based at least in part on the context data, a type of audio that is planned to be output for playback at the audio output device, wherein the type of audio is one of a plurality of types of audio capable of being output for playback at the audio output device; and
adjusting, by the computing device and based at least in part on the type of the audio and the indication of the user input, a level of a respective volume associated with the type of audio while the computing device is not currently outputting audio for playback at the audio output device.

2. The method of claim 1, wherein the indication of user input is a first indication of user input, further comprising:
receiving, by the computing device while the device is not currently outputting audio for playback at the audio output device, an indication of a second user input to perform an operation different than outputting the audio for playback at the audio output device; and
responsive to receiving the indication of the additional user input, automatically reverting, by the computing device, the level of the respective volume associated with the type of audio to an original level of the respective volume prior to adjusting the respective volume.

3. The method of claim 2, further comprising:
responsive to receiving the indication of the additional user input, adjusting, by the computing device, a level of a second volume different than the respective volume level, wherein the second volume is associated with a second type of audio from the plurality of types of audio.

4. The method of claim 1, wherein the indication of user input is a first indication of user input, wherein the content is a first content, the method further comprising:
receiving, by the computing device not currently outputting audio for playback at the audio output device, a second indication of user input to adjust a volume level of the computing device;
responsive to receiving the second indication of the user input:
determining, by the computing device, context data based on a second content associated with the application currently executing on the computing device;
determining, by the computing device and based at least in part on the context data, that no audio data is present in the second content; and
adjusting, by the computing device and based at least in part on the determination that no audio data is present in the second content, a level of a volume different than the respective volume associated with the type of audio.

5. The method of claim 1, wherein the user input is a first user input, and wherein the application is a first application, the method further comprising:
receiving, by the computing device not currently outputting audio for playback at the audio output device, an indication of a second user input to adjust a volume level of the computing device, wherein a second application is currently executing on the computing device;
responsive to receiving the indication of the second user input:
determining, by the computing device, context data based on content associated with the second application;
determining, by the computing device and based at least in part on the context data based on the content associated with the second application, that no audio data is present in the content associated with the second application; and
adjusting, by the computing device and based at least in part on the determination that no audio data is present in the content associated with the second application, a level of a volume different than the respective volume associated with the type of audio.

6. The method of claim 1, wherein the indication of user input is a first indication of user input, wherein the method further comprises:
after adjusting the respective volume level associated with the type of audio, receiving, by the computing device while the device is not currently outputting audio for playback at the audio output device, an indication of a second user input to output audio content for playback at the audio output device, wherein the audio content is of the type of audio predicted by the computing device; and
outputting, by the computing device, the audio content for playback at the audio output device at the respective volume level associated with the type of audio.

7. The method of claim 1, wherein determining the context data comprises:
detecting, by the computing device, one or more objects present in the content; and
determining, by the computing device, a data type for each of the one or more objects present in the content.

8. The method of claim 7, further comprising:
displaying, by the computing device, at a display device, a graphical indication of each of the one or more respective objects in a graphical user interface.

9. The method of claim 7, wherein predicting the type of audio comprises:

determining, by the computing device, whether a respective object of the one or more objects includes audio capable of being output for playback at the audio output device; and responsive to determining that the respective object includes the audio, predicting, based at least in part on the respective object and a context history associated with the application, the type of audio, wherein the context history comprises a likelihood that the type of audio will be output when the application is currently executing on the computing device.

10. The method of claim 9, wherein the indication of user input is a first indication of user input, the method further comprising:

receiving, by the computing device, a second indication of user input;

determining, by the computing device, an operation to perform based at least in part on the second indication of user input; and updating, by the computing device, the context history based at least in part on the operation.

11. The method of claim 10, wherein, responsive to the operation comprising outputting the audio for playback at the audio output device, updating the context history comprises increasing the likelihood that the type of audio will be output when the application is currently executing on the computing device, and wherein, responsive to the operation comprising an operation other than outputting the audio for playback at the audio device, updating the context history comprises decreasing the likelihood that the type of audio will be output when the application is currently executing on the computing device.

12. The method of claim 10, wherein updating the context history comprises:

receiving, by the computing device, an aggregated context history associated with the application, wherein:

the aggregated context history comprises a plurality of context histories, and each respective context history in the plurality of context histories is associated with a respective computing device other than the computing device; and updating, by the computing device, the context history based at least in part on the operation and the aggregated context history.

13. A computing device comprising:

an audio output device;

at least one processor; and at least one module, operable by the at least one processor to:

receive, an indication of user input to adjust a volume level of the computing device, wherein the audio output device is not currently playing back audio output by the at least one processor;

responsive to receiving the indication of the user input and prior to adjusting the volume level of the computing device:

determine context data based on content associated with an application currently executing on the computing device, wherein the context data includes playable audio of the content and an action required to output the playable audio at the audio output device; and predict, based at least in part on the context data, a type of audio that is planned to be output for playback at the audio output device, wherein the type of audio is one of a plurality of types of audio capable of being output for playback at the audio output device; and adjust, based at least in part on the type of the audio and the indication of the user input, a level of a respective volume associated with the type of audio while the audio output device is not currently playing back audio output by the at least one processor.

14. The computing device of claim 13, wherein the indication of user input is a first indication of user input, wherein the at least one module is further operable by the at least one processor to:

receive, while the audio output device is not currently playing back audio output by the at least one processor, an indication of a second user input to perform an operation different than outputting the audio for playback at the audio output device;

responsive to receiving the indication of the additional user input, automatically revert the level of the respective volume associated with the type of audio to an original level of the respective volume prior to adjusting the respective volume; and responsive to receiving the indication of the additional user input, adjust a level of a second volume different than the respective volume, wherein the second volume is associated with a second type of audio of the plurality of types of audio.

15. The computing device of claim 13, wherein the user input is a first indication of user input, wherein the content is a first content, wherein the at least one module is further operable by the at least one processor to:

receive a second indication of user input to adjust a volume level of the computing device;

responsive to receiving the second indication of the user input:

determine context data based on a second content associated with the application currently executing on the computing device;

determine, based at least in part on the context data, that no audio data is present in the second content; and adjust, based at least in part on the determination that no audio data is present in the second content, a level of a volume different than the respective volume associated with the type of audio.

16. The computing device of claim 13, wherein determining the context data comprises the at least one module being operable by the at least one processor to:

detect one or more objects present in the content; and determine a data type for each of the one or more objects present in the content, and wherein predicting the type of audio comprises the at least one module being operable by the at least one processor to:

determine whether a respective object of the one or more objects includes audio capable of being output for playback at the audio output device; and responsive to determining that the respective object includes the audio, predict, based at least in part on the respective object and a context history associated with the application, the type of audio, wherein the context history comprises a likelihood that the type of audio will be output when the application is currently executing on the computing device.

17. The computing device of claim 16, wherein the indication of user input is a first indication of user input, wherein the at least one module is further operable by the at least one processor to:

receive a second indication of user input;
    determine an operation to perform based at least in part on the second indication of user input; and
    update the context history based at least in part on the operation.

18. The computing device of claim 17, wherein, responsive to the operation comprising outputting the audio for playback at the audio output device, the at least one module is further operable by the at least one processor to update the context history by increasing the likelihood that the type of audio will be output when the application is currently executing on the computing device, and wherein, responsive to the operation comprising an operation other than outputting the audio for playback at the audio device, the at least one module is further operable by the at least one processor to update the context history by decreasing the likelihood that the type of audio will be output when the application is currently executing on the computing device.

19. The computing device of claim 17, wherein updating the context history comprises the at least one module being operable by the at least one processor to:
    receive an aggregated context history associated with the application, wherein:
        the aggregated context history comprises a plurality of context histories, and each respective context history in the plurality of context histories is associated with a respective computing device other than the computing device; and
    update the context history based at least in part on the operation and the aggregated context history.

20. A computer-readable storage medium encoded with instructions that, when executed, cause at least one processor of a computing device to:
    receive, an indication of user input to adjust a volume level of the computing device, wherein the computing device is not currently outputting audio for playback at an audio output device operatively coupled to the computing device;
    responsive to receiving the indication of the user input and prior to adjusting the volume level of the computing device:
        determine context data based on content associated with an application currently executing on the computing device, wherein the context data includes playable audio of the content and an action required to output the playable audio at the audio output device; and
        predict, based at least in part on the context data, a type of audio that is planned to be output for playback at the audio output device, wherein the type of audio is one of a plurality of types of audio capable of being output for playback at the audio output device; and
    adjust, based at least in part on the type of the audio and the indication of the user input, a respective volume level associated with the type of audio while the device is not currently outputting audio for playback at the audio output device.

* * * * *